United States Patent
Shah (10) Patent No.: US 9,507,736 B2
(45) Date of Patent: Nov. 29, 2016

(54) NETWORK CONTROLLER WITH INTEGRATED MANAGEMENT CONTROLLER

(71) Applicant: Broadcom Corporation, Irvine, CA (US)

(72) Inventor: Hemal Shah, Trabuco Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 666 days.

(21) Appl. No.: 13/659,430

(22) Filed: Oct. 24, 2012

(65) Prior Publication Data

US 2013/0326039 A1 Dec. 5, 2013

Related U.S. Application Data

(60) Provisional application No. 61/654,658, filed on Jun. 1, 2012.

(51) Int. Cl.
 *G06F 15/173* (2006.01)
 *G06F 13/12* (2006.01)
 *H04L 12/24* (2006.01)

(52) U.S. Cl.
 CPC ............ *G06F 13/128* (2013.01); *H04L 41/04* (2013.01); *H04L 41/0803* (2013.01); *Y02B 60/1228* (2013.01)

(58) Field of Classification Search
 CPC . G06F 21/572; H04L 41/0803; H04L 41/04; H04L 43/028; H04L 63/0227
 USPC ................. 709/212, 220, 223–224
 See application file for complete search history.

(56) References Cited

U.S. PATENT DOCUMENTS

| 8,977,733 | B1* | 3/2015 | Phuong et al. ............... 709/223 |
| 2003/0091042 | A1* | 5/2003 | Lor .............................. 370/389 |
| 2007/0115981 | A1 | 5/2007 | Jreij et al. |
| 2009/0164690 | A1 | 6/2009 | Slaight |
| 2009/0182799 | A1 | 7/2009 | Huang |
| 2009/0300332 | A1* | 12/2009 | Montgomery et al. ....... 712/220 |
| 2010/0005190 | A1* | 1/2010 | Shah et al. .................... 709/235 |
| 2011/0292807 | A1* | 12/2011 | Shah et al. .................... 370/237 |
| 2014/0165183 | A1* | 6/2014 | Dharmadhikari ... H04L 63/0227 726/13 |
| 2014/0230078 | A1* | 8/2014 | Graham .................. G06F 21/31 726/30 |

OTHER PUBLICATIONS

Host Programmer Interface Specification for NetXtreme® and NetLink® Family of Highly Integrated Media Access Controllers, Programmer's Reference Guide BCM5761, 434 pages, Apr. 7, 2008.

(Continued)

*Primary Examiner* — Hitesh Patel
(74) *Attorney, Agent, or Firm* — Oblon, McClelland, Maier & Neustadt, L.L.P.

(57) ABSTRACT

An network controller provides both network controller and management controller functionality. Accordingly, the system host sees, in a single device, both network functionality as well as management functionality. The integration may reduce chip count and provide a more cost effective as well as power efficient platform solution for the network and management functions in a larger system, such as a server with multiple network controllers and multiple network ports.

19 Claims, 10 Drawing Sheets

(56) References Cited

OTHER PUBLICATIONS

System Management BIOS (SMBIOS) Reference Specification, Document No. DSP0134, Version 2.7.1, Distributed Management Task Force, Inc., 136 pages, Jan. 26, 2011.
Network Controller Sideband Interface (NC-SI) Specification, Document No. DSP0222, Version: 1.0.0, Distributed Management Task Force, Inc., 122 pages, Jul. 21, 2009.
NC-SI over MCTP Binding Specification, Document No. DSP0261, Version 1.0.0A, Distributed Management Task Force, Inc., 29 pages, May 7, 2012.
Intel® 82574 GbE Controller Family, Datasheet, Order No. 317694-016, Revision 2.5, 472 pages, Apr. 2009.
Doty, et al., OS-to-BMC Pass-through: A New Chapter in System Manageability, A Dell Technical White Paper, Rev. 1.0, Dell Inc., 7 pages, Feb. 2012.
Shah, et al., Platform Management Components Intercommunications (PMCI), Distributed Management Task Force, Inc., 1 page, 2008.
European Search Report, App. No. 13002543.0-1956, Sep. 19, 2013, 4 pages.

* cited by examiner

NETWORK CONTROLLER WITH INTEGRATED MANAGEMENT CONTROLLER

CROSS REFERENCE TO RELATED APPLICATIONS

This application claims the benefit of priority to U.S. Provisional Application No. 61/654,658, filed 1 Jun. 2012. This application incorporates by reference U.S. Provisional Application No. 61/654,658.

TECHNICAL FIELD

This disclosure relates to computer networking. In particular, this disclosure relates to network controllers.

BACKGROUND

High speed data networks form part of the backbone of what has become indispensable data connectivity worldwide. Within the data networks, packet switching devices direct data packets from source ports to destination ports, helping to eventually guide the data packets to the correct recipient systems (e.g., personal computers or application servers). In virtually all instances, network controllers in the systems and switching devices control the data flows through the devices. Improvements in network controller architectures will help improve network connectivity, configurability, and flexibility.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
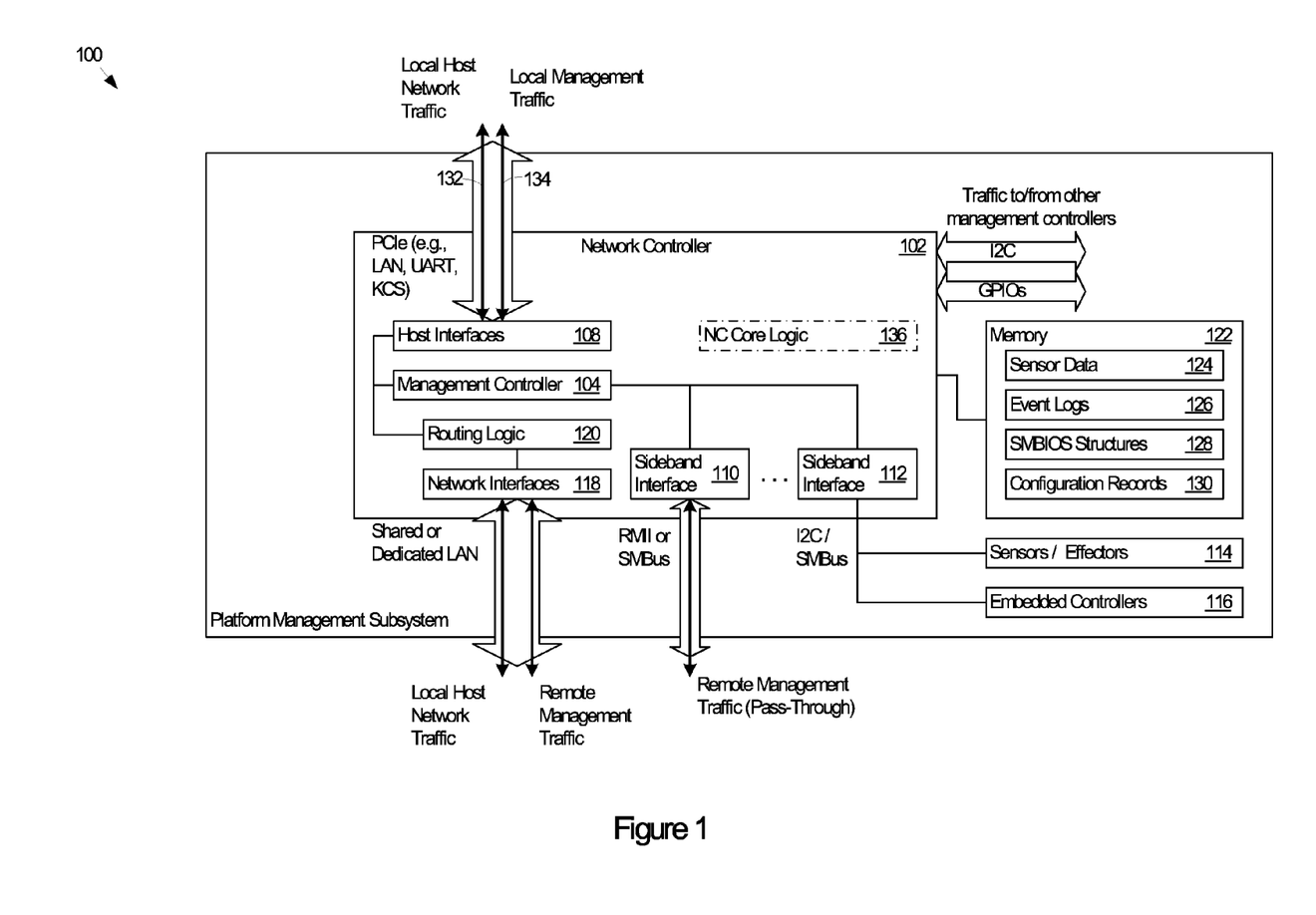
FIG. 1 shows an example of a platform management subsystem in which a management controller is integrated with the network controller.

FIG. 1 shows an example of a platform management subsystem 100 ("subsystem 100") in which a network controller 102 ("NC 102") includes a management controller 104 ("MC 104") integrated with the NC 102. The integration may be physical, logical, or both. The subsystem 100 may be part of a personal computer or other system, part of a server side network device, such as a switch or router, or part of any other system.

The NC 102 may integrate the MC 104, network controller functionality, sideband interfaces, host interfaces, network interfaces, routing logic, and any other desired logic into a single integrated circuit, such as a System on a Chip (SoC), for example. In other implementations, the logic included in the NC 102 is built, fabricated, or otherwise implemented in a Field Programmable Gate Array (FPGA), Erasable Programmable Logic Device (EPLD), or other configurable logic. The NC 102 may provide all of the functionality as a unitary subsystem implementation option, as opposed, for example, to providing the functionality on multiple separate chips.

In other implementations, the integration may be a logical integration in which separate sets of circuitry (e.g., separate physical chips) provide the functionality. The logical integration may then expose the functionality to a host as a single logical entity that includes both network controller and management controller functionality. The logical and physical integrations are in contrast to a separate device for network controller functions, a separate device for management controller functions, a separate device for sensor control, and so on. Thus, to the host, the NC 102 appears as one integrated device that has potentially multiple sets of functionality, including network controller functionality, management controller functionality (which also has visibility and control over the network interfaces in the integrated device), sensor and effector interaction, control via sideband interfaces, and other functionality as described below.

The MC 104 may implement functionality such as power control, boot control, inventory monitoring, remote configuration, BIOS management, text console redirection, USB redirection, and other management functionality. The NC 102 may implement functionality such as packet routing, switching, filtering and other network traffic flow functions. To that end, the NC 102 includes NC core logic 136 that may implement in whole or in part, or that may be in communication with any of the logic blocks shown in the NC 102. The NC core logic 136 may include, e.g., an Ethernet controller core, or other core logic that handles network traffic for any other type of network. As will be described in more detail below, the NC core logic 136 also handles traffic received on the sideband interfaces, for example when the MC 104 is disabled.

The NC 102 may implement one or more sideband interfaces, such as the sideband interfaces 110 and 112. As an example, the sideband interface 110 may support remote management pass through traffic between the network controller 102 and other network controllers or management controllers. Accordingly, the MC 104 may, for example, locally or remotely manage other network controllers that are connected to the NC 102 through the sideband interface 110. The sideband interface 110 need not be exposed to the host. In other words, the sideband interface 110 may be separate from, unknown to, or undetectable to a host communicating on the host interfaces 108. As examples, the sideband interface 110 may be a Reduced Media Independent Interface (RMII) or System Management Bus (SMBus) interface. The MC 104 may support Network Controller Sideband Interface (NC-SI) communications or other types of communications over the RMII or SMBus interfaces.

The NC 102 may implement one or more host interfaces 108, for example a PCIe interface, to a host. Both network traffic and management traffic may pass over the host interface 108. Accordingly, multiple separate physical interfaces are not required for the network traffic and for management traffic. In other words, the host interface 108 may carry both network traffic communications 132 and management traffic communications 134 between the host and the NC 102. Examples of management traffic include alerts to the MC 104, queries to the MC 104 to determine what the MC 104 configuration and capabilities are, boot options and boot order from the MC 104, as examples.

In that regard, the host interface 108 may expose, support, or communicate using any desired network interfaces or protocols over the host interface 108. As an example, the host interface 108 may expose a Keyboard Controller Style (KCS) interface, Low Pin Count (LPC) interface, Universal Asynchronous Receiver/Transmitter (UART) interface, Universal Serial Bus (USB) interface, or any combination of such interfaces. The host interface 108 may operate over a physical PCIe interface to the host, for example. In other words, the host interface 108 may expose different logical network interfaces to the local host over different physical interfaces, e.g., as PCIe functions, according to whatever interfaces the MC 104 will use (e.g., KCS for local management communications) and whatever interfaces the NC 102 will use. Exposing UART and USB functions over PCIe may allow the NC 102 to support text console and USB redirections, for example. In other words, a single PCIe interface to the host supports host control and interaction with the NC 102, MC 104, and any other logic in the NC 102.

The sideband interfaces (e.g., the sideband interfaces 110, 112) may include, as examples, a Network Controller Sideband Interface (NC-SI), General Purpose Input/Output (GPIO) interface, Inter Integrated Circuit (I2C) interface, and SMBus interfaces. As one example, the NC-SI communicates with other network controllers in the system. Thus in a system configuration that includes the NC 102 and a separate network controller B that is the only network controller connected to the external network, the MC 104 in the NC 102 may nevertheless manage the separate network controller B, by using the MC 104 to send management traffic over the sideband interface to the network controller B.

In contrast, the SMBus or I2C buses provided by the sideband interface 112 may instead communicate internally with other devices such as sensors and effectors 114 and embedded controllers 116. Examples of the sensors and effectors 114 include temperature, fan speed, voltage, current and power sensors that the MC 104 monitors to determine management actions to take, and fan on/off and fan speed controls. Any of the sideband interfaces, however, may be configured to communicate sideband communications between the sensors 114 and effectors, intelligent embedded controllers 116, other management controllers, and other network controllers whether located locally or remotely from the NC 102.

The NC 102 also includes a network interface 118 and routing logic 120. The network interface 118 may support network traffic (e.g., LAN traffic) into and out of the device that includes the subsystem 100. The network interface 118 may include one or more ports, each of which may support a certain traffic rate (e.g., 100 Mbps or 1 Gbps). The network interface 118 may include port configuration logic, e.g., including a set of status and configuration registers for the ports. The port configuration logic may control, on a global or individual basis, whether any particular port or group of ports in the network interface 118 is permitted to carry or support different types of traffic. For example, the port configuration logic may control whether any given port may carry: 1) network communication traffic for the NC 102 but no management communication traffic for the MC 104; 2) management communication traffic for the MC 104 but no network communication traffic for the 102; 3) both network communication traffic for the NC 102 and management communication traffic for the MC 104; and 4) neither network communication traffic nor management communication traffic for the MC 104 or the NC 102.

As shown in FIG. 1, the architecture of the NC 102 integrates the MC 104, multiple network interfaces 118, multiple sideband interfaces 110, 112, and multiple host interfaces 108, along with network traffic handling. The NC 102 is thus tightly coupled with the network interfaces 118, sideband interfaces 110, 112, and the host interfaces 108 for local host management traffic. The network interfaces 118 can be shared by the local host and the MC 104. When the network interface 118 is shared by both the local host and the MC 104, the routing logic 120 may separate the local host network traffic and the remote management traffic from the aggregate incoming traffic received on the network interface 118, determine the destination for the traffic (e.g., by inspecting address information in packet headers), and deliver the host network traffic to the host and deliver the management traffic to the MC 104.

The routing logic 120 may also merge both outgoing local host network traffic and remote manage traffic sent through the same network interface (e.g., through the same port). As noted above, the NC 102 or MC 104 may enable or disable host network traffic, remote management traffic or both, on an individual port basis in the network interface 118. As a result, the NC 102 may allow a network interface 118 to be dedicated to either the local host (and NC 102) or the MC 104, or shared by both.

In connection with the routing logic 120, the host may program a certain layer 2 (e.g., MAC) address, and the MC 104 may program a different MAC address for a certain port in the network interface 118. When an incoming traffic packet arrives, the routing logic 120 may examine the destination MAC address in the packet to determine whether to send the packet to the host or to the MC 104. In other scenarios, both the host and MC 104 may use the same MAC address for the port. The MC 104 may then run an out-of-band management service on top of, for example, TCP/IP, using a specific port number to receive HTTP/HTTPS traffic. The routing logic 120 may then be configured to determine whether TCP traffic is targeted to the assigned MAC and port number, and forward such packets to the MC 104. The routing logic 120 may forward all other packets to the host. This scenario may be extended to multiple different port numbers for different services running on the MC 104, with the routing logic 120 forwarding multiple port numbers or ranges of ports to the MC 104.

FIG. 1 also shows a memory 122 in communication with the NC 102. The memory 122 may be a nonvolatile memory, for example. The memory 122 may store any desired programs or data. FIG. 1 shows an example in which the memory 122 stores sensor data 124 (e.g., read by the MC 104), event logs 126, SMBIOS structures 128, and configuration records 130. The memory 122 may also store any other programs or firmware that the MC 104 or NC 102 will execute to implement any desired functionality that the MC 104 and NC 102 perform.

Figure 2:
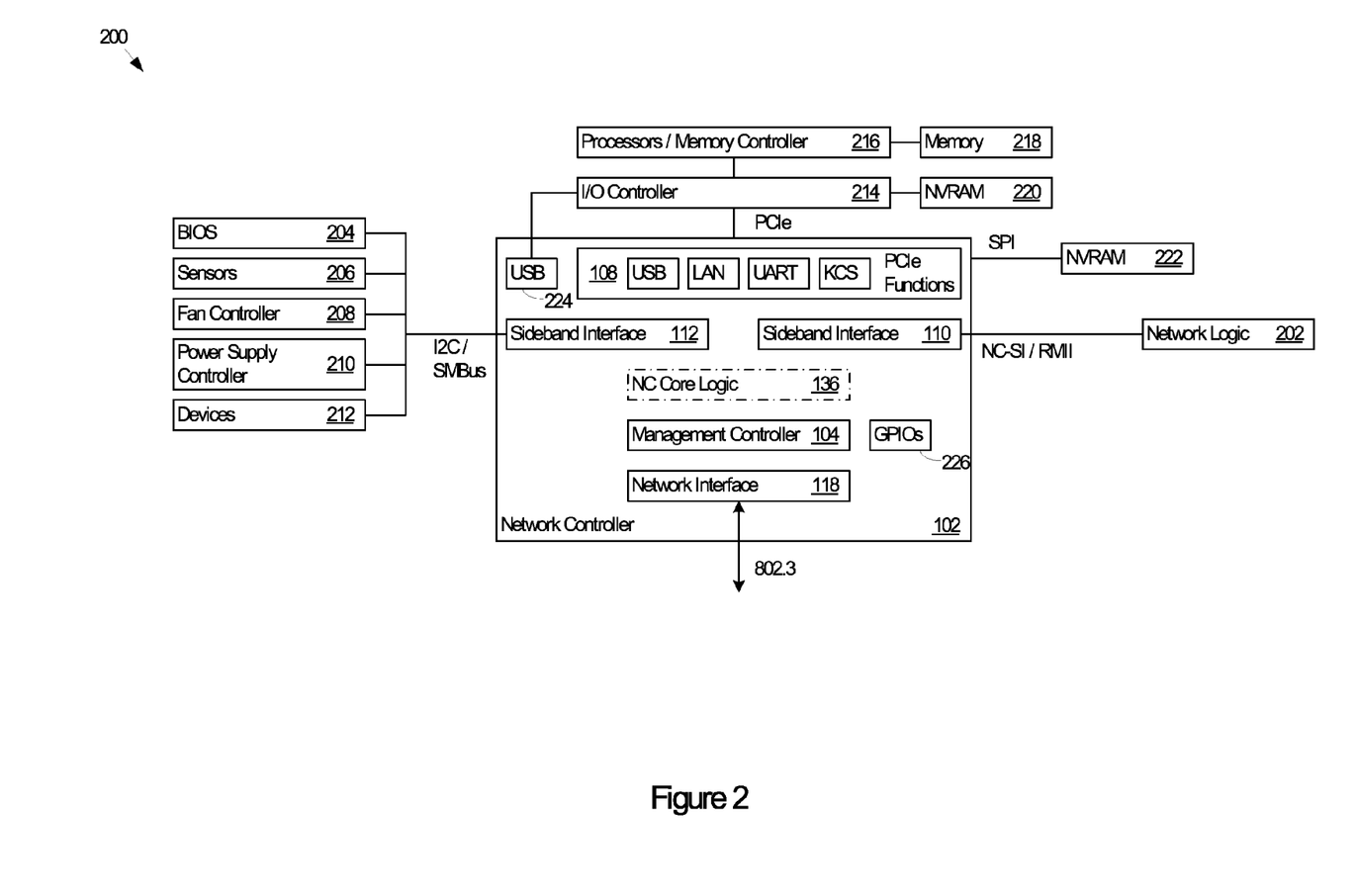
FIG. 2 is an example of the integrated interfaces in a network controller that includes both network controller and management controller functionality.

FIG. 2 is an example 200 of the integrated interfaces that may be present in the NC 102. The interfaces may be integrated, for example, by being fabricated or otherwise supported on or in the same SoC, chip, die, or other integration platform with the NC 102 and MC 104. As one specific example, in a SoC implementation, a NC 102 module may provide the interfaces shown in FIG. 2, the NC core logic 136, as well as the logic that implements the MC 104 functionality and sideband interfaces.

The host interface 108 may expose other protocols and interfaces to the host, such as the USB, UART, KCS, and LAN interfaces. The host interface 108 may connect, for example, to the host I/O controller 214 and host processors 216 over a PCIe bus or another type of bus. The processors 216 are supported by the memory 218, for example for storing programs and data under control of the processors 216. Similarly, the I/O controller 214 may be supported by the memory 220 (e.g., a non-volatile RAM) to store firmware, configuration settings, or other data. A separate USB interface 224 to the host I/O controller 214 is also shown, as are GPIOs 226 that provide further communication options for the NC 102.

The interfaces, e.g., the sideband interfaces 110 and 112, may support communications between the NC controller 102 and other NCs, MCs, baseboard management controllers (BMCs), system devices, or any other network logic 202. Accordingly, the NC 102 may communicate with, control, or respond to the other network logic 202. In the example of FIG. 2, the sideband interface 112 connects the network controller 102 to supporting logic, such as the BIOS 204, sensors 206, fan controller 208, power supply controller 210, and other devices 212. Yet another example of an integrated interface is the Serial Peripheral Bus Interface (SPI). The SPI interface may connect the network controller 102 to additional memory resources, for example, including the non-volatile memory 222. The interfaces further include the network interface 118 for communicating LAN traffic and management traffic, on a port-by-port configurable basis. In addition, the interfaces include the sideband interface 112.

The integration provides, in one NC 102, all of the network ports and interfaces for both network controller functions and management controller functions. As noted above, the network ports can be individually configured to allow any combination of management and network communication traffic. Packet filtering and merging logic facilitates delivering traffic to the appropriate controller or host and sending and receiving both network and management communications over the same port.

Figure 3:
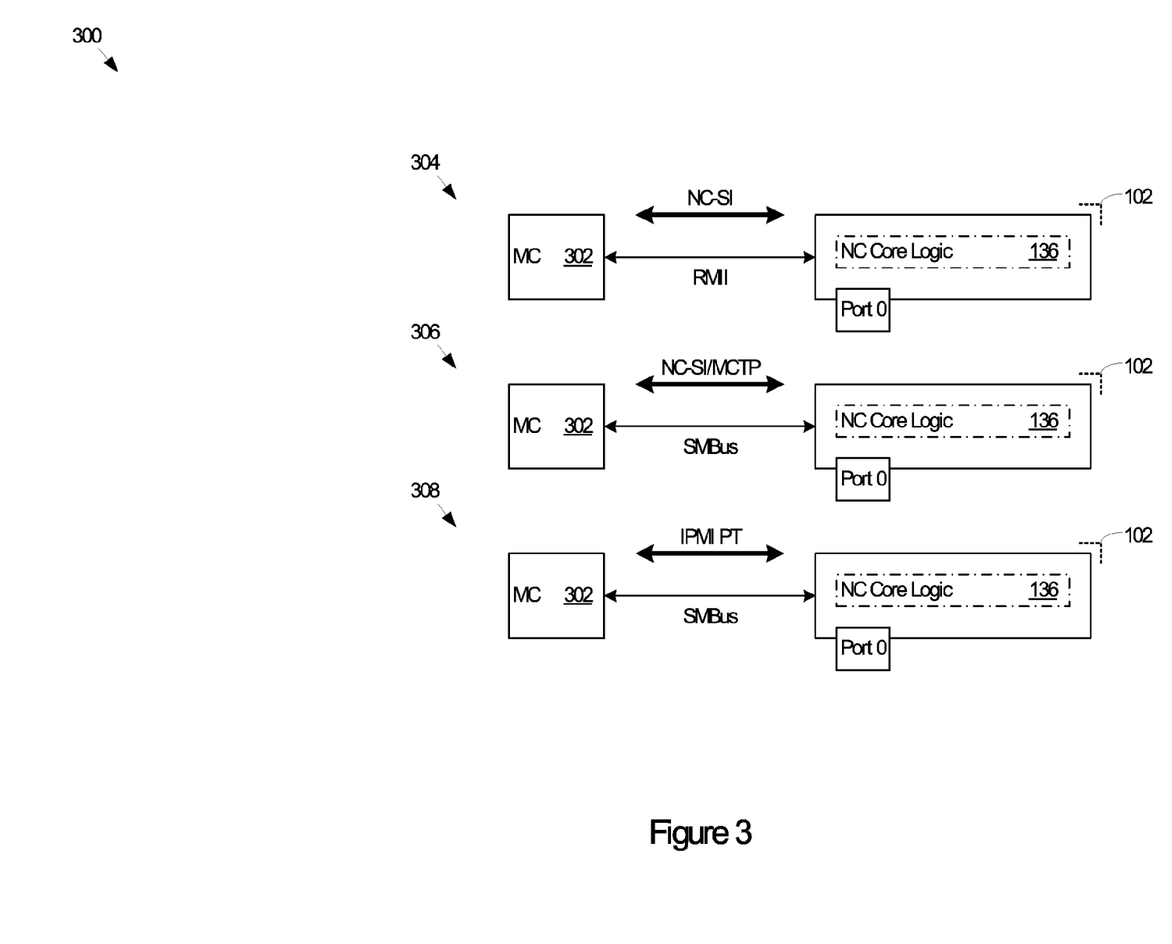
FIG. 3 shows examples of communicating management traffic through a network controller via a sideband communication mechanism in place between the network controller and a management controller.

FIG. 3 shows examples 300 in which the NC 102 is not presently using its integrated MC 104. For example, the NC 102 may have disabled or deactivated its integrated MC 104. In that regard, the NC 102 may provide all of the functions of a network controller, without the functions of the MC 104, when desired.

More particularly, FIG. 3 shows several examples of communication pass through models for the NC 102. The NC 102 is in communication with a local or remote management controller 302 ("MC 302"), e.g., a baseboard management controller. The connection to the MC 302 may be made over any of the sideband interfaces to the NC 102, for example. The MC 302 may thereby manage the NC 102 itself, or manage, through the NC 102, other devices connected to the network ports implemented in the NC 102. In other words, the NC 102 may pass the management communications received from the MC 302 out of any of the network ports supported by the NC 102. Port zero is shown in FIG. 3 as the network port, but any port may be used for passing through the configuration communications from the MC 302.

In the example 304, the MC 302 executes network controller configuration using NC-SI over the RMII. In the example 306, the MC 302 executes network controller configuration using NC-SI/Management Component Transport Protocol (MCTP) over the SMBus. In the example 308, the MC 302 executes network controller configuration using the Intelligent Platform Management Interface (IPMI) Pass Through (PT) over the SMBus. FIG. 3 shows the flexibility of the NC 102, with three different examples of pass through communications over different physical interfaces for three different protocols and two different physical interfaces: NC-SI protocol over the RMII interface, NC-SI/MCTP over SMBus, and IPMI over SMBus.

As noted above, the NC core logic 136 is in communication with the logic blocks in the NC 102, including the sideband interfaces. For example, the NC core logic 136 may be connected to packet buffers or any other communication interface logic that supports the sideband interfaces. As a result, when the MC 104 is disabled, the NC core logic 136 may receive the management communications over the sideband interfaces and take whatever management action is appropriate for those messages. As example, the NC core logic 136 may handle NC-SI control (request/response) communications, NC-SI Pass-through communications for management traffic, and Asynchronous Event Notifications (AENs) from the NC 102 to the MC 302.

Figure 4:
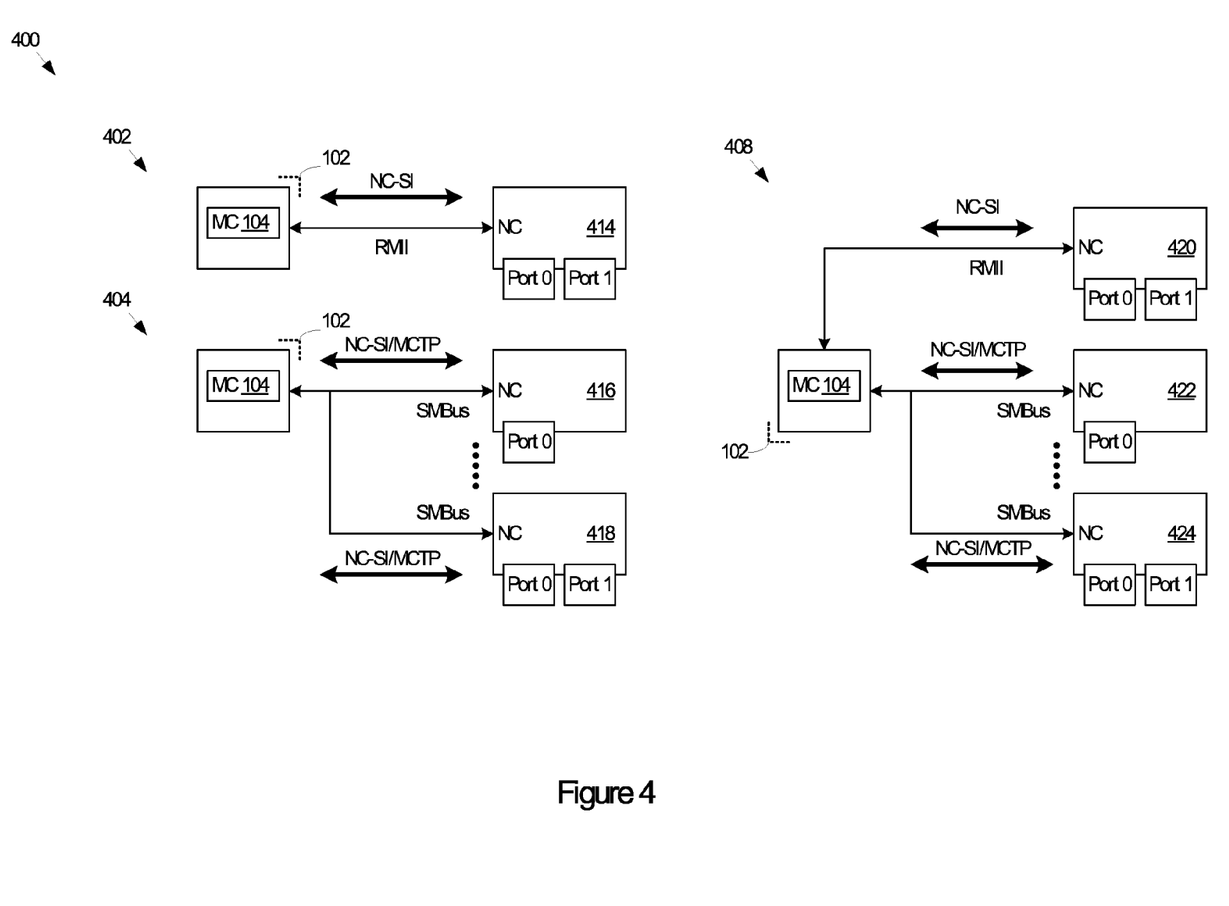
FIG. 4 shows examples of communicating management traffic through multiple network controllers via different sideband communication mechanisms between the network controllers and the management controller.

FIG. 4 shows examples 400 in which the NC 102 is not presently using its integrated network controller functionality, but is using its MC 104 functionality. For example, the NC 102 may have disabled or deactivated all or part of the NC core logic 136 that provides integrated network controller functions, and enabled the MC 104. In other words, the NC 102 may function as a management controller, without providing network controller functionality, when desired.

More particularly, FIG. 4 shows several examples of communication pass through models for the NC 102, by which the MC 104 in the NC 102 manages network controllers that are separate from the NC 102 that integrates the MC 104. In the examples shown in FIG. 4, the MC 104 manages by the NCs 414, 416, 418, 420, 422, and 424. Additionally, when the NCs 414-424 support pass-through, the MC 104 may manage NCs remote from, but connected to, the NCs 414-424. In that regard, the NCs 414-424 may forward management communications received from the MC 104 out the network ports to any devices connected to those network ports. Similarly, the NCs 414-424 may forward management communications received from any devices connected to the network ports to the MC 104. The managed NCs may be local or remote from the MC 104. Ports zero and one are shown in FIG. 4 as the network ports in either single channel or dual channel mode, but the MC 104 may remotely manage any ports or combination of ports in any of the NCs 414-424, or in any NCs connected to the NCs 414-424.

In the example 402, the MC 104 manages the NC 414 using NC-SI over the RMII. In the example 404, the MC 104 manages NCs 416 and 418 using NC-SI/MCTP over the SMBus (e.g., using sideband interfaces). In the example 408, the MC 104 manages NCs 420, 422, and 424 NC-SI/MCTP over the SMBus and other interfaces, such as NC-SI over RMII.

Figure 5:
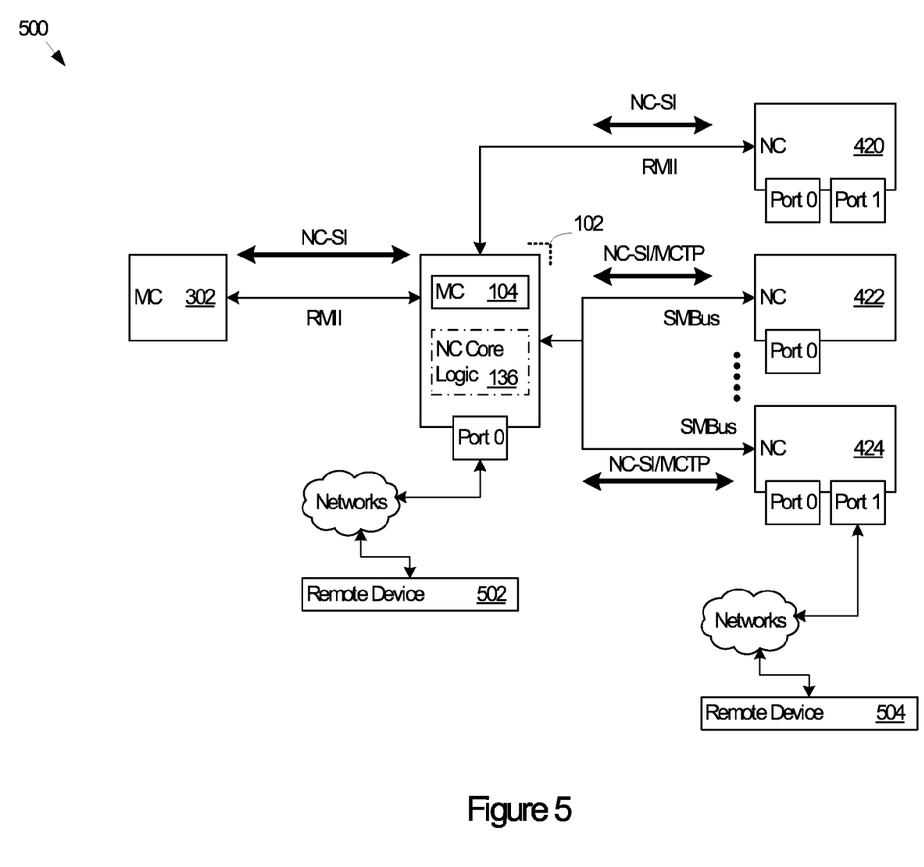
FIG. 5 shows management and communication examples in which the network controller has both its network controller and management controller functionality active.

FIG. 5 shows an example 500 in which the NC 102 has both its network controller functionality active and its management controller functionality active. Accordingly, an external MC (e.g., the MC 302) may manage the NC 102 itself as described above with respect to FIG. 3. The MC 302 may also communicate with separate network devices such as the remote device 502, using pass through communications, also as described above with respect to FIG. 3. In that regard, the NC 102 may pass management communications intended for the remote device 502 through the NC 102, out a network port, to the remote device 502.

Because the MC 104 is also active, the NC 102 may manage other devices and respond to management actions specified in management communications received at the NC 102. As examples, the MC 104 may configure the NCs 420, 422, or 424. Additionally, using pass through communications, the MC 104 may communicate with, for example, the remote device 504 as described above with respect to FIG. 4.

Figure 6:
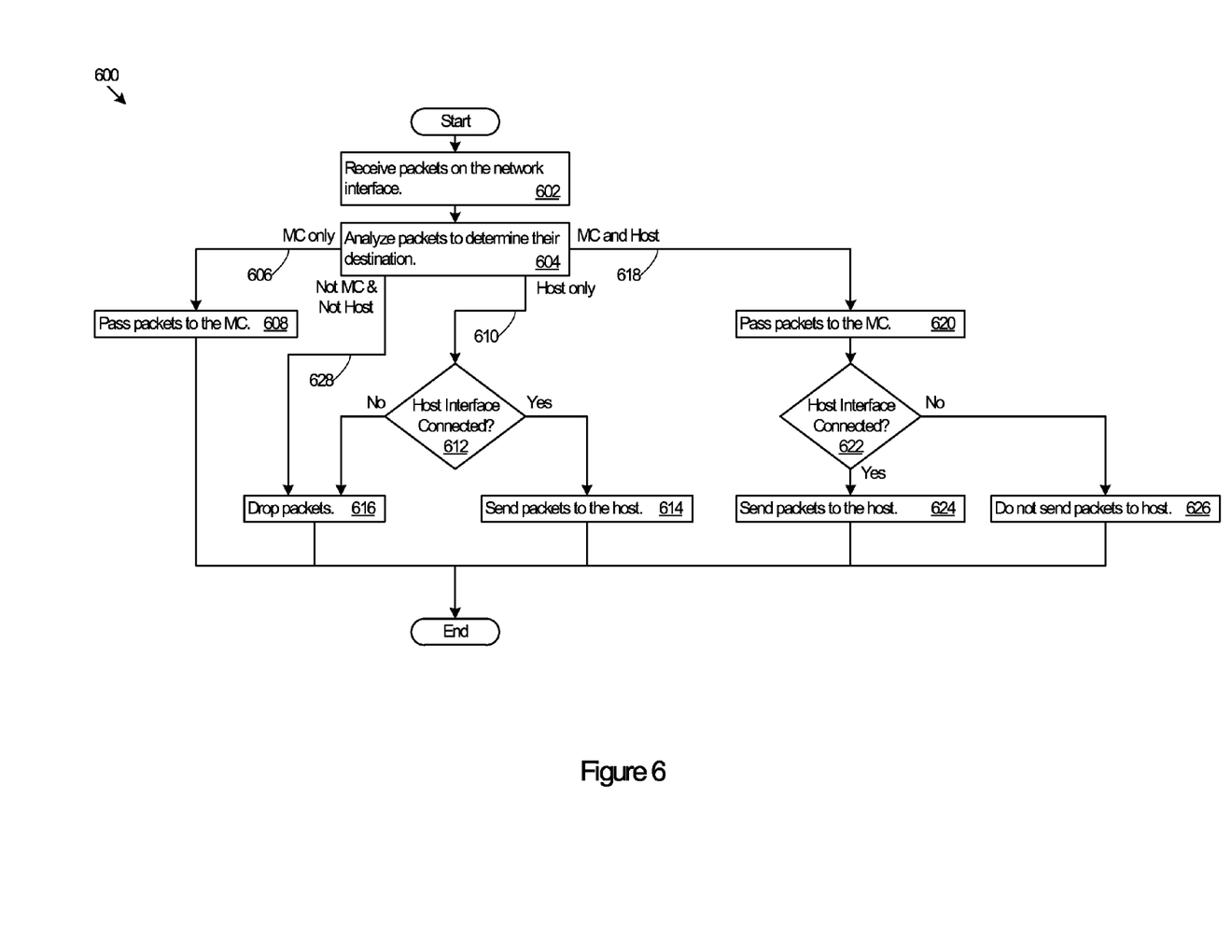
FIGS. 6-10 show examples of logic that the network controller may implement.

FIG. 6 shows an example of logic 600 that the NC 102 may implement in any combination of hardware and software/firmware, executed, for example, by the routing logic 120. As shown in FIG. 6, the NC 102 receives packets on the network interface 118 (602). The NC 102 analyzes the packets to determine their destination (604). When the packets are destined for the MC 104 only (606), the NC 102 may forward the packets (and thus any management communication in the packets) to the MC 104 (608).

When the packets are destined for the host only (610), the logic 600 may determine whether the host interface is connected (612). When the host interface is connected, the NC 102 may forward the packets (and thus any network communication in the packets) to the host (614). However, if the host interface is not connected, the NC 102 may instead drop the packets (616), because the packets will not be delivered to any recipient.

In some cases, as shown in FIG. 6, the packets are destined for both the host and the MC104 (618). Examples of such packets include Address Resolution Protocol (ARP) request packets, but other types of packets may be delivered to both the MC and the host as well. For packets destined for both the MC and the host, the logic 600 delivers the packets to the MC (620). In addition, the logic 600 determines whether the host interface is connected (622). If the host interface is connected, then the logic 600 also delivers the packets to the host (624). Otherwise, the logic 600 does not deliver the packets to the host (626). The logic 600 may drop packets that are not destined for either the host or the MC 104 (628), The packet processing illustrated in FIG. 6 may operate on any packets received at the network interface for as long as the logic 600 desires to continue processing packets received at the network interface.

Figure 7:
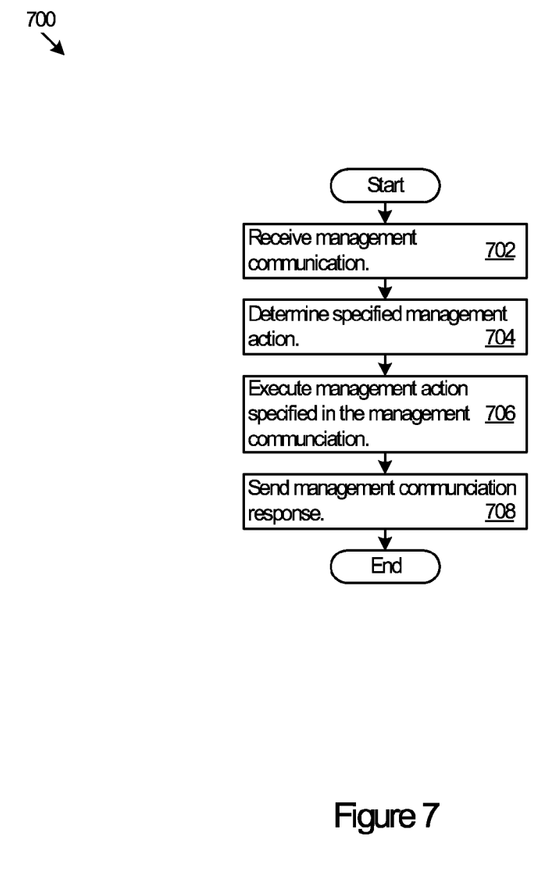

FIG. 7 shows logic 700 that the MC 104 may implement when receiving management communications on the sideband interface or network interface 118. The NC 102 may receive the management communications over any available interface in the NC 102. The NC 102 passes the management communications to the MC 104. Alternatively, when the MC 104 is disabled, the NC core logic 136 in the NC 102 may receive the management communications.

The NC 102 receives the management communications (702). The NC 102 also determines which management action the management communication specifies (704), and executes that management action, if possible (706). The NC 102 may also send a response to the management communication (708). The response may, for example, acknowledge receipt of the management communication, and include response status codes indicating whether the management action was carried out, any errors encountered, any responsive data requested in the management communication, or other data.

Figure 8:
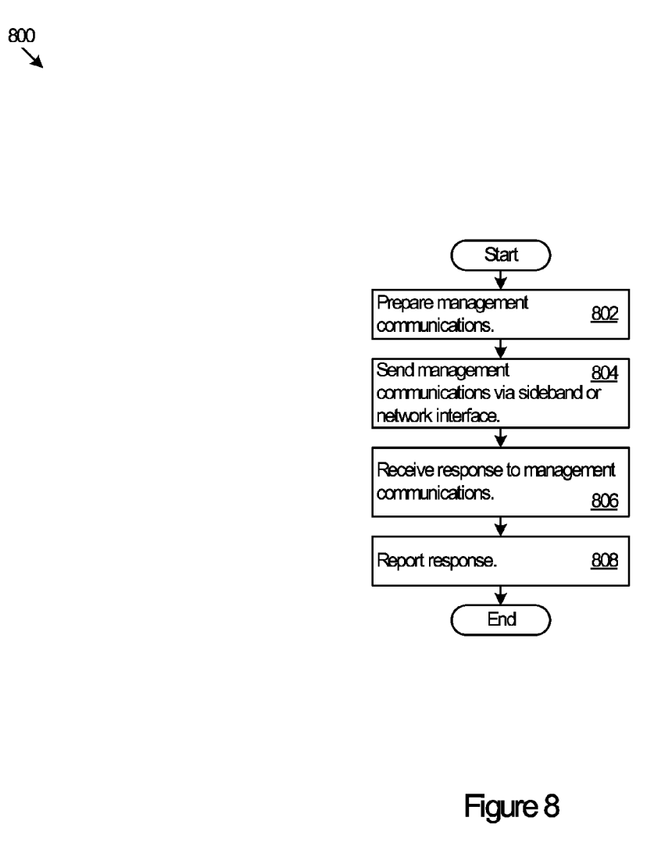

FIG. 8 shows logic 800 that the NC 102 may implement when sending management communications, e.g., prepared by the MC 104. The NC 102 prepares a management communication (802). The management communication may attempt to manage a remote network controller, for example. The NC 102 sends the management communication through any available interface, such as a sideband interface or network interface (604). In addition, the NC 102 may receive and process any response to its management communication (806). In that regard, the NC 102 may report the response (808), e.g., to the host, which may take further action based on the response.

Figure 9:
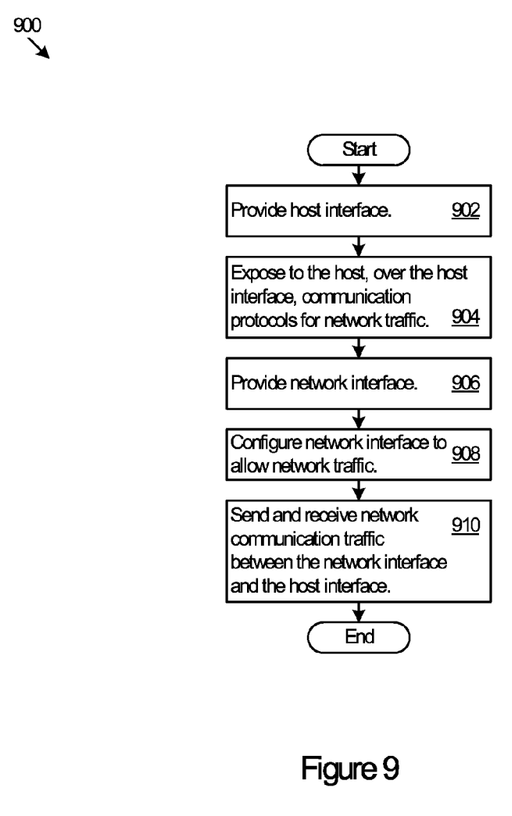

FIG. 9 shows logic 900 that the NC 102 may implement for handing network traffic received at the host interface 108. The NC 102 provides the physical host interface 108 (902), such as a PCIe interface, and exposes the communication protocols over the host interface that the host may use to communicate network traffic to the NC 102 (904). In addition, the NC 102 provides the network interface 118 (906). The NC 102 selectively configures the network interface 118 to enable or disable network traffic, e.g., on a port by port basis, as noted above (908). Accordingly, the NC 102 may send and receive network traffic between the host and the network, with the network traffic traveling between the host interface 108 and the network interface 118 (910).

Figure 10:
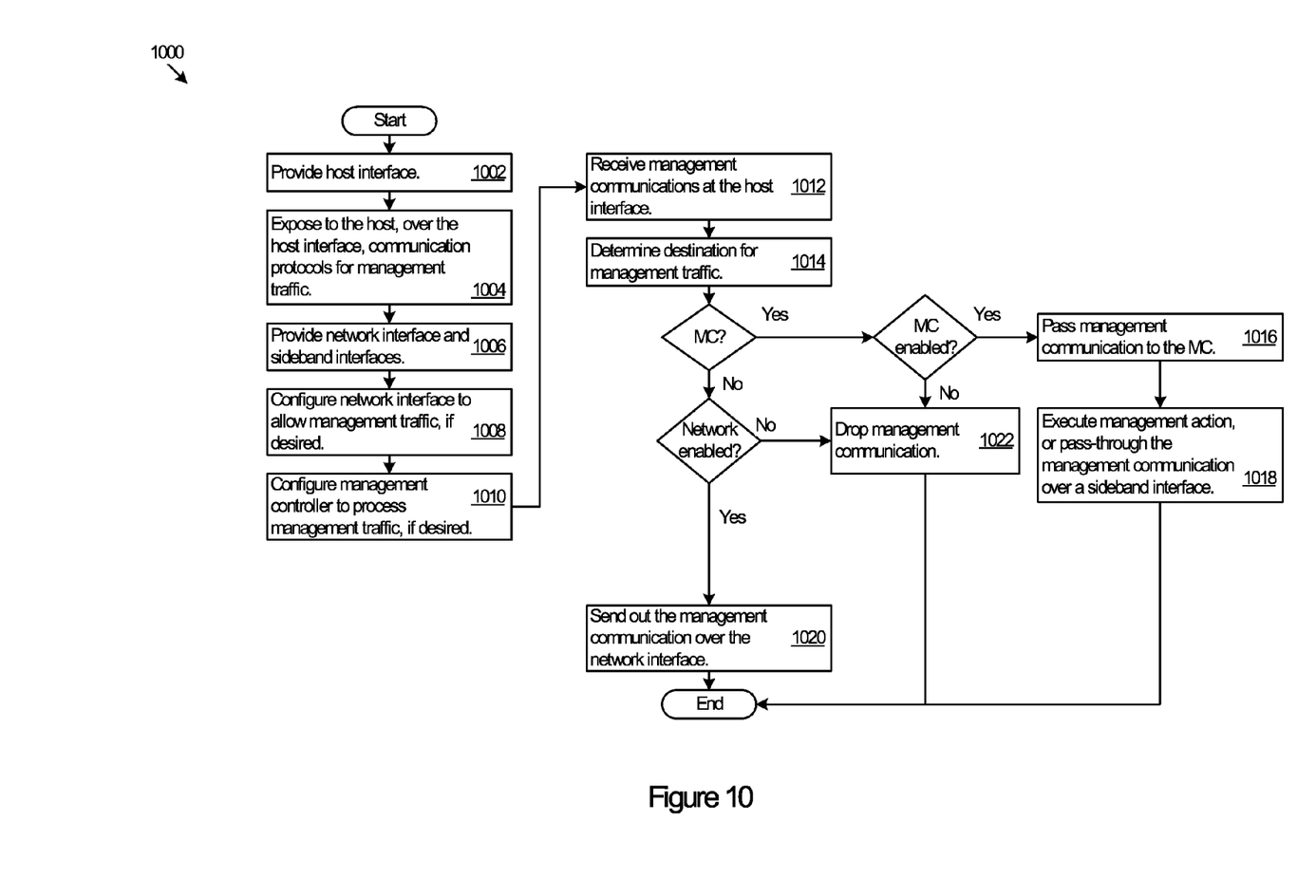

FIG. 10 shows logic 1000 that the NC 102 may implement for handling management traffic received at the host interface 108. The NC 102 provides the physical host interface 108 (1002), such as a PCIe interface. As described above, the NC 102 also exposes the communication protocols over the host interface that the host may use to communicate management traffic to the NC 102 (1004). In addition, the NC 102 provides the network interface 118 and sideband interfaces (1006). The NC 102 selectively configures the network interface 118 to enable or disable management communication traffic, e.g., on a port by port basis, as noted above (1008). Also, the NC 102 may selectively enable or disable the MC 104 (1010).

The NC 102 receives management communications at the host interface 108 (1012). The NC 102 determines the destination for the management communication (1014). For example, the management communication may be intended to pass through the network interface 118 and out of the NC 102 over a network connection, or may be intended for the MC 104.

Accordingly, when the management communication is intended for the MC 104, the NC 102 passes the management communication to the MC 104 (1016). However, if the MC 104 is disabled, the NC 102 may instead drop the management communication (1022). The NC 102 optionally returns a responsive status message to the host or other source of the management communication regarding successful or unsuccessful delivery of the management communication to the MC 104.

The MC 104 may then execute the management action specified in the management communication (1018). Alternatively or additionally, the MC 104 may pass through the management communication over a sideband interface (1018). Accordingly, the management communication may pass through the NC 102 to other network entities over the sideband interfaces.

Similarly, when the management communication is intended to pass through over the network interface 118, the NC 102 sends the management communication out over the network interface 118 (1020). However, if the NC 102 has disabled management traffic on the network interface 118, then the NC 102 may instead drop the management communication (1022). The NC 102 optionally returns a responsive status message to the host or other source of the management communication that specifies successful or unsuccessful transmission of the management communication out through the network interface 118.

To summarize the architecture described above, a server side network device includes a NC 102 that includes both network controller functionality and a management controller. In addition, a host interface from the NC 102 connects to a local host and the host interface is shared by the NC 102 and the MC 104 so that separate network and management interfaces are not required. The host interface may be configured to support network traffic communication with the host and also support management traffic communication with the host (e.g., over a single host interface).

Additionally, one or more network interfaces may be provided in the NC 102 for network traffic (e.g., LAN traffic). The network interfaces may include one or more ports, for example, each of which may support a certain traffic rate (e.g., 100 Mbps or 1 Gbps). The network interfaces may include port configuration logic that is operable to specify, on a global or individual basis whether any particular port or group of ports is permitted to carry or support: 1) network communication traffic for the network controller but no management communication traffic for the management controller; 2) management communication traffic but no network communication traffic; 3) both network communication traffic and management communication traffic; and 4) neither network communication traffic nor management communication traffic.

The NC 102 may also include routing logic 120. The routing logic 120 may include packet filters, traffic merging logic, or other routing logic. The routing logic 120 may be configured to direct management traffic communications received on the network interface 118 to the management controller 104 and to direct network traffic received on the network interface 118 to the host.

As examples, the management traffic communication may be handled using: Low Pin Count (LPC) communications, Keyboard Controller Style (KCS) communication, Universal Asynchronous Receiver/Transmitter communication, Universal Serial Bus (USB) communication, or any combination thereof. The host interface 108 may be a Peripheral Component Interconnect Express (PCIe) interface. The host interface 108 may be configured to expose different protocols for handling network traffic, management traffic, or both.

The NC 102 may further include one or more sideband interfaces that need not be exposed to the host. One example of a sideband interface is a sensor interface. The sensor interface may connect the NC 102 to sensors such as temperature, fan speed, voltage, current, or power sensors. The sideband interfaces may also include an embedded controller interface that connects the NC 102 to an embedded controller.

The sideband interfaces may also connect the NC 102 to other network controllers or management controllers. Thus, the MC 104 in the NC 102 may be configured (e.g., via software or firmware instructions) to manage the other network controllers or management controllers through the sideband interfaces. The NC 102 may be a System on a Chip (SoC) or other integrated circuit integration of management functionality and network functionality into a logic section that reduces chip count. Thus instead of providing a separate management controller chip and network controller chip, the NC 102 may include both sets of functionality on a single chip, for example.

In the architecture described above, a NC 102 with an integrated MC 104 provides both the network connectivity as well as remote management functions for the NC 102. This may reduce chip count, for example, and provide a more cost effective as well as power efficient platform solution for the network and management functions. In addition, the exposure of network interfaces, redirection interfaces, and local system management interfaces over PCIe by the NC 102 may permit the use of a single physical system interface (e.g., PCIe) for communicating all of local host network traffic, redirected UART/USB traffic, and local management traffic. Note also that the integrated network interfaces of the NC 102 can be flexibly configured on an individual basis (e.g., by the host) to be either shared by both the local host and the integrated MC 104, or dedicated to the local host or the integrated MC 104. The integrated sideband interfaces (e.g., the GPIO, I2C/SMBus, and RMII sideband interfaces) allow the NC 102 to directly interface with the sensors, embedded controllers, other network controllers, and other management controllers inside or external to the NC 102.

The NC 102 does not require multiple components for network and management functions, due to the integration. This makes the NC 102 more cost effective and power efficient. Further, the NC 102 does not require multiple physically separate system interfaces (e.g., PCIe, KCS, LPC, and others) to be available in the system to connect network and management controllers to the host processor and memory system. Furthermore, in the NC 102, the network interfaces 118 that carry communications for the MC 104 are visible to the host and can be used to communicate host network traffic.

The configurability of the network controller 102 permits the network controller 102 to provide a wide range of selectable functionality. For example, the network controller 102 may be configured to appear to the host as both a management controller and integrated network controller. Alternatively, the network controller 102 may be configured to appear to the host as only a management controller. Further, the network controller 102 may be configured to appear to the host as only a network controller. Any subset of functionality in the network controller 102 may be enabled or disabled on an individual basis for the host to recognize and interact with.

Some of the benefits of the NC 102 include providing a low cost, low power, reliable solution. The network controller 102 may be implemented, for example, on a single SoC or other integrated logic section, which facilitates field upgradability and ease of deployment. The NC 102 architecture is operating system, processor, and chipset independent, and also provides a flexible and extensible feature set (e.g., via local or remote firmware updates). The NC 102 architectures integrates management features, including inventory management, monitoring, power control, text, keyboard/video/mouse redirection, firmware updates, and other management features, without requiring additional separate physical interfaces to a separate management controller. In addition, the architecture may integrate with a selected standards implementation, by providing standardized interfaces to management services infrastructure requirements of the selected standard.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in a network controller, computer system, or other device, cause the device to perform operations according to any of the description above.

What is claimed is:

1. A network controller, comprising:
   network controller circuitry including a host interface and a network interface, the network controller circuitry configured to receive management communication from a host via the host interface and to determine a destination for the management communication; and
   management controller circuitry integrated with the network controller circuitry, the management controller circuitry including a sideband interface that is separate from the host interface and the network interface, wherein
   the network controller circuitry is further configured to
      send, when the management controller circuitry is not the destination and the network interface is enabled, the management communication to the destination via the network interface,
      drop the management communication when the management controller circuitry is not the destination and the network interface is disabled,
      drop the management communication when the management controller circuitry is the destination and the management controller circuitry is disabled, and
      pass the management communication to the management controller circuitry when the management controller circuitry is the destination and the management controller circuitry is enabled,
   the management controller circuitry is configured to, when the management controller circuitry receives the management communication from the network controller circuitry, execute a management action according to the management communication or pass the management communication over the sideband interface,
   the network interface is integrated into the network controller circuitry, and
   the network interface is configured to communicate network data into and out of integrated logic circuitry comprising the network controller circuitry, the management controller circuitry, the host interface and the sideband interface.

2. The network controller of claim 1, wherein the host interface is configured to support both network communication traffic with the host and management communication traffic with the host.

3. The network controller of claim 1, wherein the network controller circuitry is configured to set a register to indicate whether the network interface supports transmission of management communication traffic.

4. The network controller of claim 2, wherein the host interface is configured to receive management communication traffic comprising:
   Keyboard Controller Style (KCS) traffic, Universal Asynchronous Receiver/Transmitter traffic, Universal Serial Bus (USB) traffic, or any combination thereof.

5. The network controller of claim 1, wherein the host interface comprises a Peripheral Component Interconnect Express (PCIe) physical interface configured to expose a communication protocol for handling management communication traffic with the host over the host interface.

6. The network controller of claim 1, wherein the network controller circuitry is further configured to
   direct management communication traffic received via the network interface to the management controller circuitry, and
   direct network communication traffic received via the network interface to the host, to the management controller circuitry, or to both.

7. The network controller of claim 1, further comprising:
   a sensor interface in communication with the sideband interface.

8. The network controller of claim 1, wherein the management controller circuitry is configured to send communications to an external device via the sideband interface.

9. The network controller of claim 1, wherein the network controller circuitry is configured to send communications via the network interface.

10. The network controller of claim 2, wherein
    the network controller circuitry comprises a System on a Chip (SoC), and
    the management controller circuitry, the host interface, the sideband interface, and the network interface are integrated on the SoC.

11. A network controller, comprising:
    a host interface;
    network controller circuitry configured to receive management communication from a host via the host interface and to determine a destination for the management communication; and
    management controller circuitry, wherein
    the host interface is shared by the network controller circuitry and the management controller circuitry,
    the network controller circuitry is further configured to
       send the management communication to the destination via a network interface when the management controller circuitry is not the destination and the network interface is enabled, the network interface being accessible by the network controller circuitry and separate from the host interface,
       drop the management communication when the management controller circuitry is not the destination and the network interface is disabled,
       drop the management communication when the management controller circuitry is the destination and the management controller circuitry is disabled, and
       pass the management communication to the management controller circuitry when the management controller circuitry is the destination and the management controller circuitry is enabled,
    the management controller circuitry is configured to, when the management controller circuitry receives the management communication from the network controller circuitry, execute a management action according to the management communication or pass the management communication over a sideband interface that is separate from the host interface and the network interface,
    the network interface is integrated into the network controller circuitry, and
    the network interface is configured to communicate network data into and out of integrated logic circuitry comprising the network controller circuitry, the management controller circuitry, the host interface and the sideband interface.

12. The network controller of claim 11, wherein the network controller circuitry comprises a System on a Chip (SoC), a Field Programmable Gate Array (FPGA), or an Erasable Programmable Logic Device (EPLD).

13. The network controller of claim 11, wherein the network controller circuitry is configured to set a register to indicate whether the network interface supports transmission of management communication traffic.

14. The network controller of claim 7, wherein the sensor interface is configured to control temperature sensors, fan speed sensors, voltage sensors, current sensors, power sensors, or any combination thereof.

15. A method, comprising:
receiving, by network controller circuitry including a host interface and a network interface, management communication from a host via the host interface;
determining, by the network controller circuitry, a destination for the management communication;
sending the management communication to the destination via the network interface when management controller circuitry that is integrated with the network controller circuitry is not the destination and the network interface is enabled;
dropping the management communication when the management controller circuitry is not the destination and the network interface is disabled;
dropping the management communication when the management controller circuitry is the destination and the management controller circuitry is disabled;
passing, by the network controller circuitry, the management communication to the management controller circuitry when the management controller circuitry is the destination and the management controller circuitry is enabled; and
when the management controller circuitry receives the management communication from the network controller circuitry, executing, by the management controller circuitry, a management action according to the management communication or passing the management communication, by the management controller circuitry, over the sideband interface, wherein
the network interface is integrated into the network controller circuitry,
the network interface is configured to communicate network data into and out of integrated logic circuitry comprising the network controller circuitry, the management controller circuitry, the host interface and the sideband interface.

16. The method of claim 15, further comprising:
communicating network communication traffic and management communication traffic with the host.

17. The method of claim 16, further comprising:
setting a communication configuration for the network interface according to the management communication.

18. The method of claim 17, wherein the setting the communication configuration comprises:
selectively permitting and denying the network communication traffic, and
selectively permitting and denying the management communication traffic.

19. The method of claim 15, further comprising:
setting a register to indicate whether the network interface supports transmission of management communication traffic.

* * * * *